US012809723B2

(12) United States Patent
Laier et al.

(10) Patent No.: US 12,809,723 B2
(45) Date of Patent: Nov. 24, 2026

(54) USING DIFFERENTIAL CHECKPOINTS TO SEARCH NON-LOGICAL FILE SYSTEM METADATA

(71) Applicant: Dell Products L.P., Round Rock, TX (US)

(72) Inventors: Max Laier, Seattle, WA (US); Chris Stacey, Seattle, WA (US); Sudhakar Rao, Black Diamond, WA (US); Mayank Rajawat, Issaquah, WA (US)

(73) Assignee: Dell Products L.P., Round Rock, TX (US)

( * ) Notice: Subject to any disclaimer, the term of this patent is extended or adjusted under 35 U.S.C. 154(b) by 55 days.

(21) Appl. No.: 18/972,618

(22) Filed: Dec. 6, 2024

(65) Prior Publication Data

US 2026/0161512 A1 Jun. 11, 2026

(51) Int. Cl.
*G06F 11/14* (2026.01)
*G06F 11/1446* (2026.01)

(52) U.S. Cl.
CPC ...... *G06F 11/1453* (2013.01); *G06F 11/1435* (2013.01)

(58) Field of Classification Search
CPC ... G06F 11/14; G06F 11/1453; G06F 11/1435
See application file for complete search history.

(56) References Cited

U.S. PATENT DOCUMENTS 7,146,524 B2 * 12/2006 Patel .................. G06F 11/1076 714/6.23
7,386,546 B1 6/2008 Santry
7,685,126 B2 * 3/2010 Patel .................. G06F 11/1076 711/113
9,678,968 B1 * 6/2017 Taylor ................ G06F 11/1435
9,697,229 B2 7/2017 Masinter
10,049,019 B2 * 8/2018 Iwasaki ................ G06F 16/162
11,003,542 B1 5/2021 Kucherov
(Continued)

OTHER PUBLICATIONS

"Python Elasticsearch Client" Elasticsearch B.V., 2023. [https://elasticsearch-py.readthedocs.io/en/v8.14.0/index.html#compatibility] retrieved Dec. 2, 2025, 8 pages.
(Continued)

*Primary Examiner* — Kamini B Patel
(74) *Attorney, Agent, or Firm* — Amin, Turocy & Watson, LLP

(57) ABSTRACT

The technologies described herein are generally directed toward using differential checkpoints to search non-logical file system metadata. For instance, a system can, based on a comparison of a first metadata state capture of a data storage system with a second metadata state capture, identify changed metadata of a data object. The system can further, based on the changed metadata, generate a metadata checkpoint object. Further, the system can receive an indication from a consumer process that, the metadata checkpoint object has been processed to generate a data modification command configured to be received by a record system node, and to change contents of a record system, and the data modification command has been processed by the record system node to alter the contents of the record system based on the data modification command.

20 Claims, 10 Drawing Sheets

(56) References Cited

U.S. PATENT DOCUMENTS

| | | | | |
|---|---|---|---|---|
| 2007/0180217 | A1* | 8/2007 | Raymond | G06F 11/1438 711/E12.065 |
| 2008/0270776 | A1* | 10/2008 | Totolos | G06F 11/1441 713/1 |
| 2009/0157694 | A1* | 6/2009 | Lee | G06F 16/14 |
| 2010/0332456 | A1* | 12/2010 | Prahlad | G06Q 50/188 713/160 |
| 2012/0130956 | A1 | 5/2012 | Caputo | |
| 2013/0110778 | A1* | 5/2013 | Taylor | G06F 11/1435 707/624 |
| 2013/0111262 | A1* | 5/2013 | Taylor | G06F 11/2097 714/4.11 |
| 2014/0324773 | A1 | 10/2014 | Ding | |
| 2018/0004607 | A1* | 1/2018 | Iwasaki | G06F 16/162 |
| 2018/0239674 | A1 | 8/2018 | Hutchison | |
| 2019/0005110 | A1 | 1/2019 | Povalyayev | |
| 2019/0347033 | A1* | 11/2019 | Wei | G06F 3/0673 |
| 2023/0409535 | A1 | 12/2023 | Kashi Visvanathan | |
| 2024/0086417 | A1 | 3/2024 | Kashi Visvanathan | |
| 2024/0134566 | A1 | 4/2024 | Ye | |
| 2026/0003887 | A1 | 1/2026 | Madan | |

OTHER PUBLICATIONS

“Create API key API” Elastic [https://www.elastic.co/guide/en/elasticsearch/reference/8.14/security-api-create-api-key.html ] retrieved Dec. 1, 2025, 9 pages.

“Security privileges” Elastic. [https://www.elastic.co/guide/en/elasticsearch/reference/8.14/security-privileges.html#application-privileges] retrieved Dec. 1, 2025, 10 pages.

“DataIQ User Guide” Dell Technologies. [https://www.dell.com/support/manuals/en-us/data-iq/dataiq_pub_user_guide/key-features?guid=guid-5f914a0a-5240-4c3d-99ca-d4fd8e2aed77&lang=en-us] retrieved Dec. 1, 2025, 2 pages.

“Diskover” [https://diskoverdata.com/] retrieved Dec. 1, 2025, 12 pages.

“Dell InsightIQ 4.3.0.0 User Guide” Dell Technologies. [https://www.dell.com/support/manuals/en-us/isilon-insightiq/iiq-pub-insightiq-user-guide-4.3.0.0/introduction-to-insightiq?guid=guid-f3ba79ec-afe4-4749-a0d6-314c6b866113&lang=en-us] retrieved Dec. 1, 2025, 1 page.

“VAST Cluster 5.2 Administrator’s Guide” VAST Catalog Overview. [https://support.vastdata.com/s/document-item?bundleId=vast-cluster-administrator-s-guide5.2&topicId=managing-data/vast-catalog/vast-catalog-overview.html&_LANG=enus], previously located at [https://vastdata.zendesk.com/hc/en-us/articles/11910669270172-VASTCatalog-Overview] retrieved Dec. 2, 2025, 734 pages.

Ma et al. “Using Differential Checkpoints To Maintain a Data Store of File System Metadata” U.S. Appl. No. 18/972,601, filed Dec. 6, 2024, 44 pages.

Ma et al. “Using Differential Checkpoints To Maintain a Data Store of Directory Metadata of a File System” U.S. Appl. No. 19/457,734, filed Jan. 23, 2026, 47 pages.

Office Action mailed Mar. 13, 2026 for U.S. Appl. No. 18/972,601, 57 pages.

Notice of Allowance mailed Jul. 1, 2026 for U.S. Appl. No. 18/972,601, 46 pages.

* cited by examiner

USING DIFFERENTIAL CHECKPOINTS TO SEARCH NON-LOGICAL FILE SYSTEM METADATA

BACKGROUND

Modern systems that manage data stores employ processes that improve fault tolerances and provide different ways to search based on different types of metadata. In some implementations, storage systems may store large amounts of data, and different approaches may have to be used to achieve system goals.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example method may include modifying, by a system comprising at least one processor, a working version of metadata that was retrieved from a first physical storage location in a file system, with the metadata being associated with a file of the file system, resulting in a change to a non-logical property of the metadata. The example method may further include storing, by the system, the working version of the metadata in a second physical storage location in the file system different from the first physical storage location. Further, the example method may include, based on the change, generating, by the system, a differential snapshot of the file system.

Additionally or alternatively, the metadata may be included in an inode that references the file, and the modifying of the working version of the metadata results in a modified inode. Additionally or alternatively, the storing of the working version of the metadata includes storing the modified inode to the second physical storage location. Additionally or alternatively, the non-logical property may include a physical storage location where file data corresponding to the file is stored within storage of the file system, and the changing of the non-logical property may include changing the physical storage location where the file data is stored. Additionally or alternatively, the physical storage location may include a tier of the tiers of the file system.

Additionally or alternatively, the example method may further include, based on the differential snapshot, analyzing historical movement of the file data to different tiers of the file system. Additionally or alternatively, the changing of the non-logical property may occur during a restriping of the file system that implicates the physical storage location where the file data is stored. Additionally or alternatively, the example method may further include committing, by the system, the change to the metadata. Additionally or alternatively, the method may further include, based on the differential snapshot, enabling, by the system, a search for the change to the non-logical property of the metadata of the file. Additionally or alternatively, the search is enabled based on a combining of the differential snapshot with a base snapshot of the file system before the change.

Additionally or alternatively, the search may include a search of a first version of the metadata that was included in the base snapshot and a second version of the metadata that was included in the differential snapshot. Additionally or alternatively, the storing of the working version of the metadata in the second physical storage location may include performing a copy on write procedure with the change to the non-logical property of the metadata.

An example system can operate as follows. At least one memory may store computer executable instructions, and at least one processor may be configured to process the computer executable instructions that, when executed by the at least one processor, facilitate performance of operations. The operations may include receiving a data modification command associated with a data object stored by a data storage system. The operations may further include executing the data modification command at a database, resulting in storage of a database record that may include a metadata checkpoint that may include a change to a physical storage location of the data object. Further, the method may include accessing the database to yield a result that includes the change to the physical storage location.

Additionally or alternatively, the physical storage location may include a diskpool of diskpools of the data storage system, with the diskpool corresponding to a storage device, and the result may include an analysis of historical movement of data that may include the data object being moved among the diskpools. Additionally or alternatively, the analysis may include analysis of movement of the data object from a first diskpool having a performance capability to a second diskpool having a different performance capability. Additionally or alternatively, the metadata checkpoint may include a differential checkpoint, and, at the executing of the data modification command, the database may include an initial metadata checkpoint of the data storage system, with the accessing of the database including a search of a combination of the initial metadata checkpoint and the differential checkpoint. Additionally or alternatively, the metadata checkpoint may include a change to an object descriptor that references the data object, with the metadata checkpoint being generated based on a change to the object descriptor being detected and referenced by the metadata checkpoint.

An example non-transitory machine-readable medium may include executable instructions that, when executed by at least one processor, facilitate performance of operations. The operations may include modifying a file descriptor associated with a file of a file system, resulting in a change to a non-logical characteristic of the file. The operations may further include generating a state capture of the file system, with the state capture including the change to the non-logical characteristic of the file. Further, the operations may include, based on the state capture, updating a searchable collection of states of the file system, with a result of searching the searchable collection of states including a reference to the file and the change to the non-logical characteristic of the file.

Additionally or alternatively, the modifying of the file descriptor may include modifying the file descriptor with a write isolation procedure. Additionally or alternatively, the modifying of the non-logical characteristic of the file is based on at least part of a fault-tolerant data storage procedure employed to store data of the file system.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Various specific details of the disclosed embodiments are provided in the description below. One skilled in the relevant art(s) will recognize, however, that the techniques described herein can in some cases be practiced without one or more of the specific details, or with other methods, components, materials, etc. In other instances, well-known structures, materials, or operations are not shown or described in detail to avoid obscuring subject matter.

By utilizing one or more implementations as described herein, the performance of a computing system that implements and/or otherwise interacts with file storage systems or other similar data storage systems, can be improved, e.g., by providing approaches to improving fault-tolerance and metadata search capabilities while preserving or improving the performance of the data systems. One or more embodiments described herein provide solutions to problems of latency and performance losses that can occur when attempting to search, track, and/or analyze non-logical metadata about files in file systems that store large amounts of data. These problems become especially complex when multiple large data systems are sought to be searched collectively, and when metadata of the data stored in the data system frequently undergoes significant changes. Further, it is noted that implementations described herein can provide solutions to technical problems that are inextricably tied to computer systems. For example, approaches that may analyze rapid changes to large amounts of data and metadata in real time, and adjust different configuration settings to achieve complex multivariate solutions, e.g., that reduce latency and performance losses in the checkpointing and searching process. As described below, embodiments described herein utilize approaches that solve these and other technical problems with technical solutions. Moreover, implementations described herein can provide these solutions in a manner that cannot reliably be performed by a human or even a plurality of humans, e.g., analyzing rapid changes to massive data storage systems and configuring hardware settings of distributed systems so as to improve overall performance without compromising other considerations.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
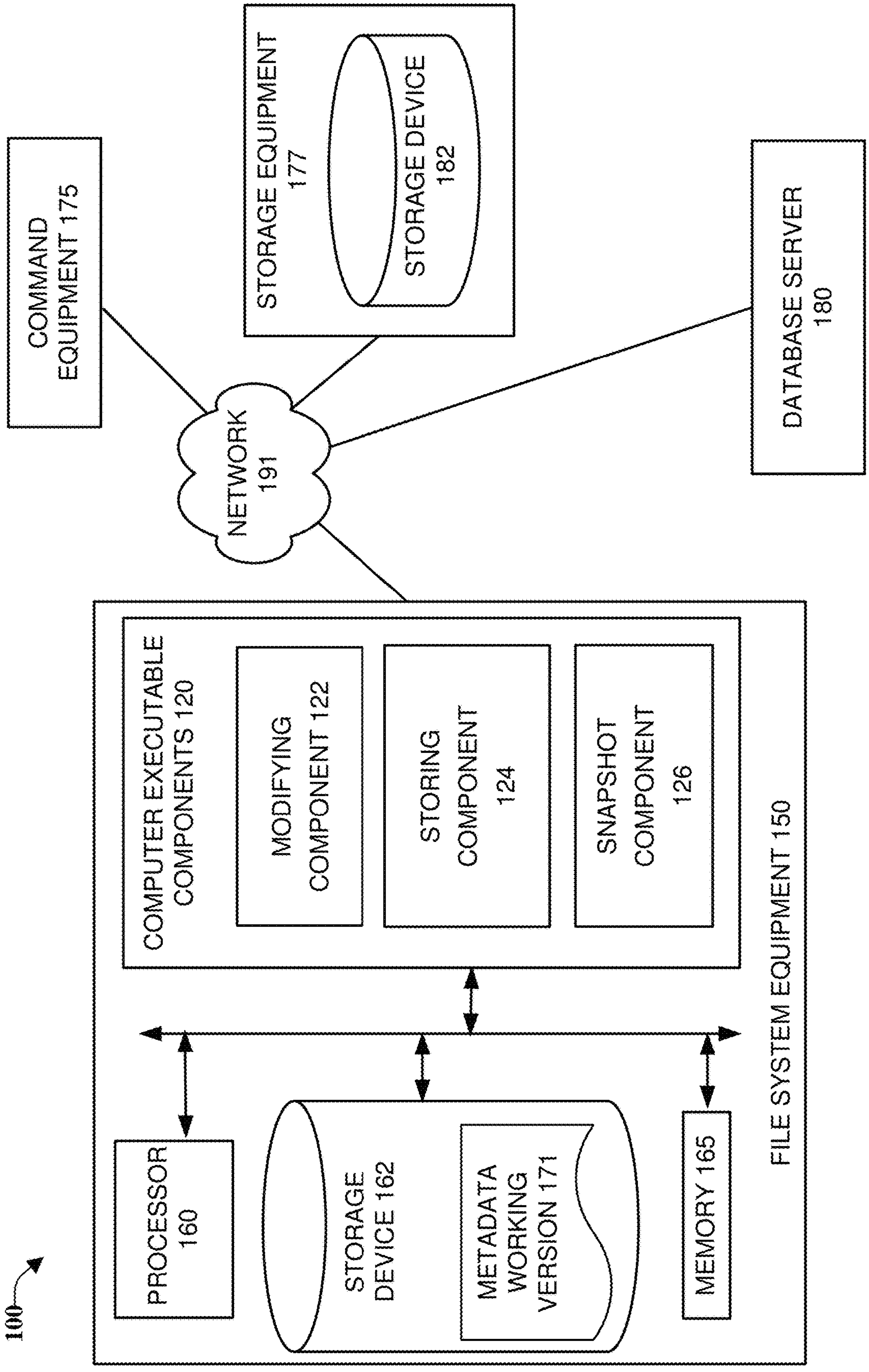
FIG. 1 is an architecture diagram of an example system that can facilitate using differential checkpoints to search non-logical file system metadata, in accordance with one or more embodiments.

FIG. 1 is an architecture diagram of an example system 100 that can facilitate using differential checkpoints to search non-logical file system metadata, in accordance with one or more embodiments. For purposes of brevity, description of like elements and/or processes employed in other embodiments is omitted. As depicted, system 100 includes file system equipment 150 connected, via network 191, to database server 180, command equipment 175, and storage equipment 177. Storage equipment 177 includes storage device 182.

As depicted, file system equipment 150 can include memory 165 that can store one or more computer and/or machine readable, writable, and/or executable components 120 and/or instructions. In embodiments, file system equipment 150 can further include processor 160. In one or more embodiments, computer executable components 120, when executed by processor 160, can facilitate performance of operations defined by the executable component(s) and/or instruction(s). Computer executable components 120 can include modifying component 122, storing component 124, snapshot component 126, and other components described or suggested by different embodiments described herein, that can improve the operation of system 100. File system equipment 150 may further include storage device 162. In an example, storage device 162 and storage device 182 may provide nonvolatile storage of data, data structures, computer executable instructions, and so forth, e.g., storage device 162 is depicted as storing metadata working version 171, e.g., with this version also potentially being stored in volatile memory, such as memory 165.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a System on a Chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

As discussed further with FIG. 10 below, network 191 can employ various wired and wireless networking technologies. For example, embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3× (5G Option 3×), high speed packet access (HSPA), Z-Wave, Zigbee and other 802.XX wireless technologies and/or legacy telecommunication technologies.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. In an example, memory 165 can store executable instructions that can facilitate generation of modifying component 122, which can in some implementations, modify a working version of metadata that was retrieved from a first physical storage location in a file system, with the metadata being associated with a file of the file system, resulting in a change to a non-logical property of the metadata. For example, in one or more embodiments, modifying component 122 may modify metadata working version 171 that was retrieved from a first physical storage location of storage device 182, with the metadata being associated with a file of the file system, resulting in a change to a non-logical property of the metadata.

In another example, memory 165 can store executable instructions that can facilitate generation of storing component 124, which in some implementations may store the working version of the metadata in a second physical storage location in the file system different from the first physical storage location. For example, in one or more embodiments, storing component 124 can store metadata working version 171 in a second physical storage location of storage device 182 different from the first physical storage location.

In another example, memory 165 can store executable instructions that can facilitate generation of snapshot component 126, which in some implementations may, based on the change, generate a differential snapshot of the file system. For example, in one or more embodiments, snapshot component 126 may, based on the change, generate a differential snapshot of the file system, e.g., based on metadata working version 171 and the changes to the non-logical metadata of the file.

It should be noted that file system equipment 150, database server 180, storage equipment 177, and other devices discussed herein, can execute code instructions that may operate on servers or systems, remote data centers, or 'on-box' in individual client information handling systems, according to various embodiments described herein. In some embodiments, it is understood any or all implementations of one or more embodiments described herein can operate on a plurality of computers, collectively referred to as file system equipment 150. For example, one or more of file system equipment 150, database server 180, and storage equipment 177, can all be separate subsystems running in the kernel of a computing device as well as operating on separate network equipment, e.g., as depicted in FIGS. 1 and 2.

Figure 2:
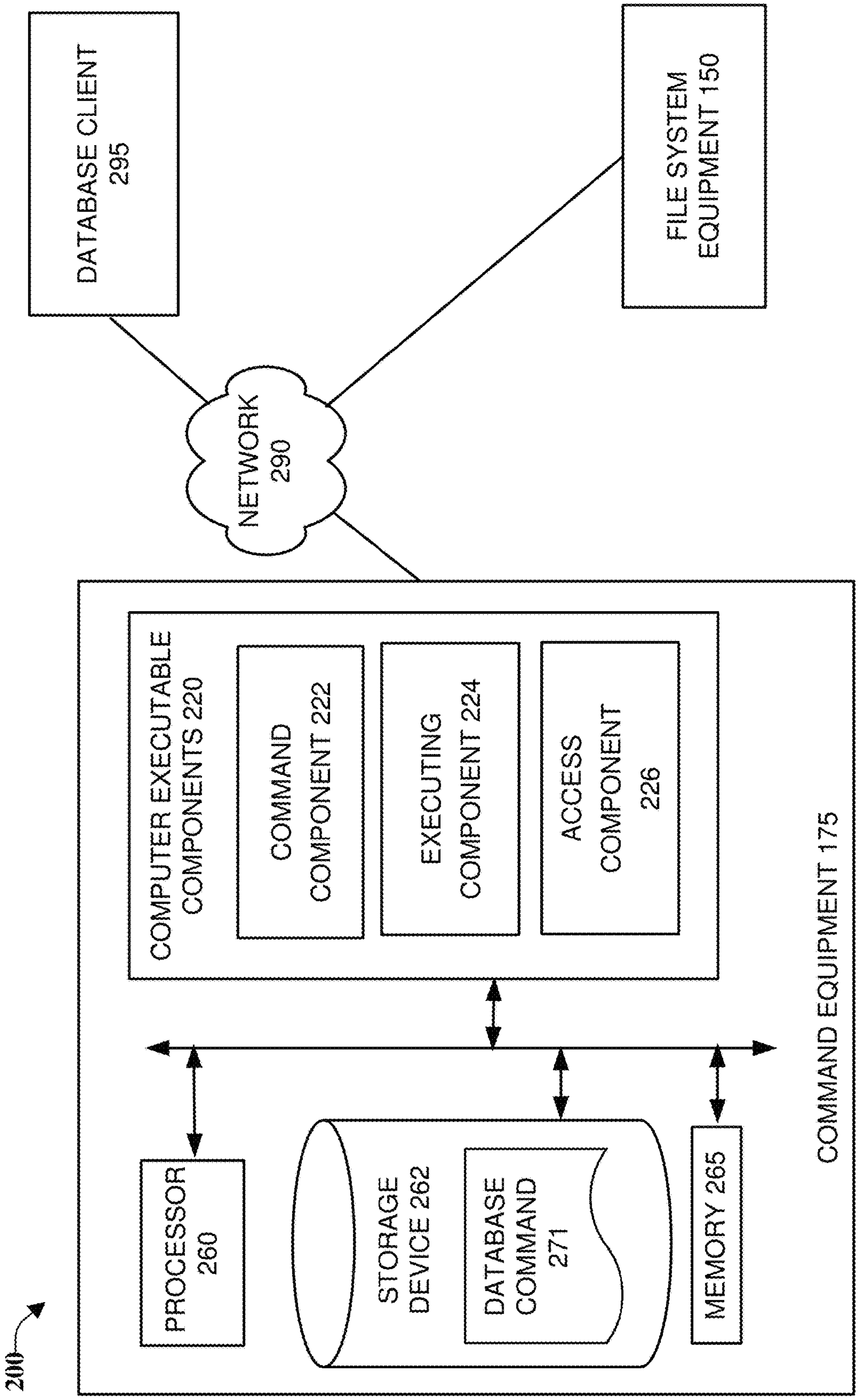
FIG. 2 is an architecture diagram of an example system that can facilitate using differential checkpoints to search non-logical file system metadata, in accordance with one or more embodiments.

FIG. 2 is an architecture diagram of an example system 200 that can facilitate using differential checkpoints to search non-logical file system metadata, in accordance with one or more embodiments. For purposes of brevity, description of like elements and/or processes employed in other embodiments is omitted. As depicted, system 200 includes command equipment 175 connected, via network 290, to file system equipment 150 and database client 295 (e.g., connected to database server 180 (not shown)). Command equipment 175 includes processor 260, memory 265, storage device 262, and computer executable components 220.

In embodiments, processor 260 is similar to processor 160 and storage device 262 is similar to storage device 162, discussed above. According to multiple embodiments, memory 265 can store one or more computer and/or machine readable, writable, and/or executable components 220 and/or instructions. In one or more embodiments, computer executable components 220, when executed by processor 260, can facilitate performance of operations defined by the executable component(s) and/or instruction(s). Computer executable components 220 can include command component 222, executing component 224, access component 226, and other components described or suggested by different embodiments described herein, e.g., that can improve the operation of system 200, in accordance with one or more embodiments.

In an example implementation of command equipment 175, memory 265 can store executable instructions that can facilitate generation of command component 222, which in some implementations, may receive a data modification command associated with a data object stored by a data storage system. For example, one or more embodiments, file system command component 222 may receive database command 271 (e.g., a data modification command) associated with a file (e.g., a data object) stored by storage equipment 177 (e.g., data storage system.

In an example implementation of database server 180, memory 265 can further store executable instructions that can facilitate generation of executing component 224, which in some implementations, may execute the data modification command at a database, resulting in storage of a database record that comprises a metadata checkpoint, with the metadata checkpoint including a change to a physical storage location of the data object. For example, in one or more embodiments, executing component 224 may execute database command 271 at database server 180 via database client 295, resulting in storage of a database record in database server 180 that comprises a metadata checkpoint, with the metadata checkpoint including a change to a physical storage location of the file.

In an example implementation of database server 180, memory 265 can further store executable instructions that can facilitate generation of access component 226, which in some implementations, may access the database to yield a result that includes the change to the physical storage location. For example, in one or more embodiments, access component 226 may access database server 180 to yield a result that includes the change to the physical storage location, e.g., as captured with working metadata version 171.

Figure 3:
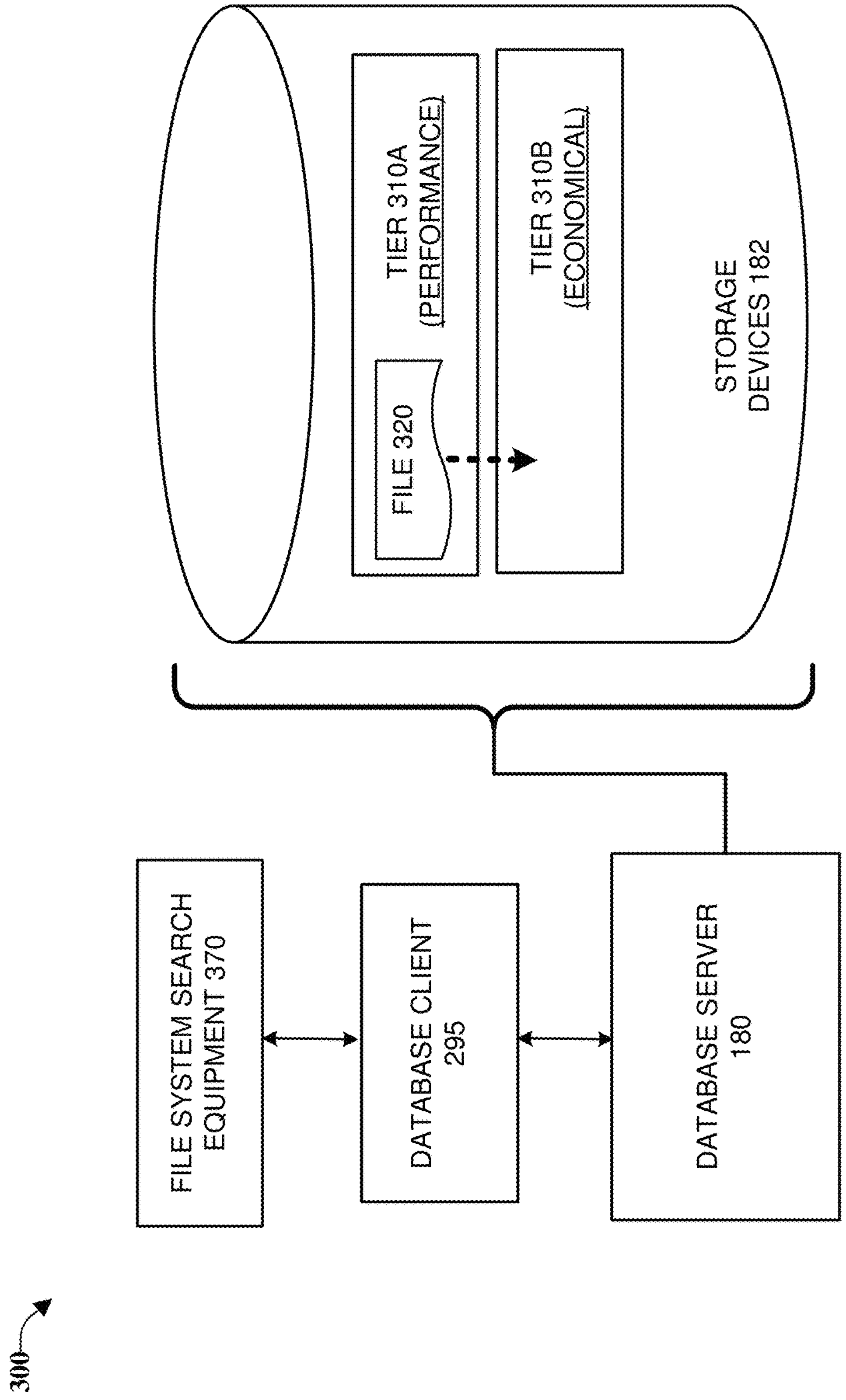
FIG. 3 includes a diagram of an example system that can facilitate using differential checkpoints to search non-logical file system metadata, in accordance with one or more embodiments.

FIG. 3 includes a diagram of an example system 300 that can facilitate using differential checkpoints to search non-logical file system metadata, in accordance with one or more embodiments. System 300 includes file system search equipment 370, database client 295, database server 180, and storage device 182. Storage device 182 includes file system storage tiers 310A-B, with file 320 depicted as being logically moved from tier 310A to tier 310B.

In some implementations, system 300 provides a system for searching non-logical file system metadata, in accordance with one or more embodiments. For example file system search equipment 370 can receive a search at a presentation layer that is translated by database client 295 into a query of database server 180. In this example, the search is for non-logical information about file 320, e.g., where in the file system of storage device 182 is file 320 physically located.

In some file systems, different advantages may be realized when physical storage devices 182 are characterized according to system capabilities. In this example, storage devices 182 are grouped into tiers, e.g., with devices having comparatively higher performance being grouped in tier 310A and devices having less performance and comparatively more economical operation being grouped in tier 310B. It is understood that tiers is an example grouping, and other hardware groupings such as diskpools may be used with embodiments.

Continuing discussion of system 300, in an implementation, a client user may search for the current physical location of file 320, as well as information describing different performance and cost characteristics of the physical location. Further, as discussed below, because embodiments can store and search differential snapshot in database server 180, analysis of the historical movement of file 320 among different tiers of the file system may be provided.

Figure 4:
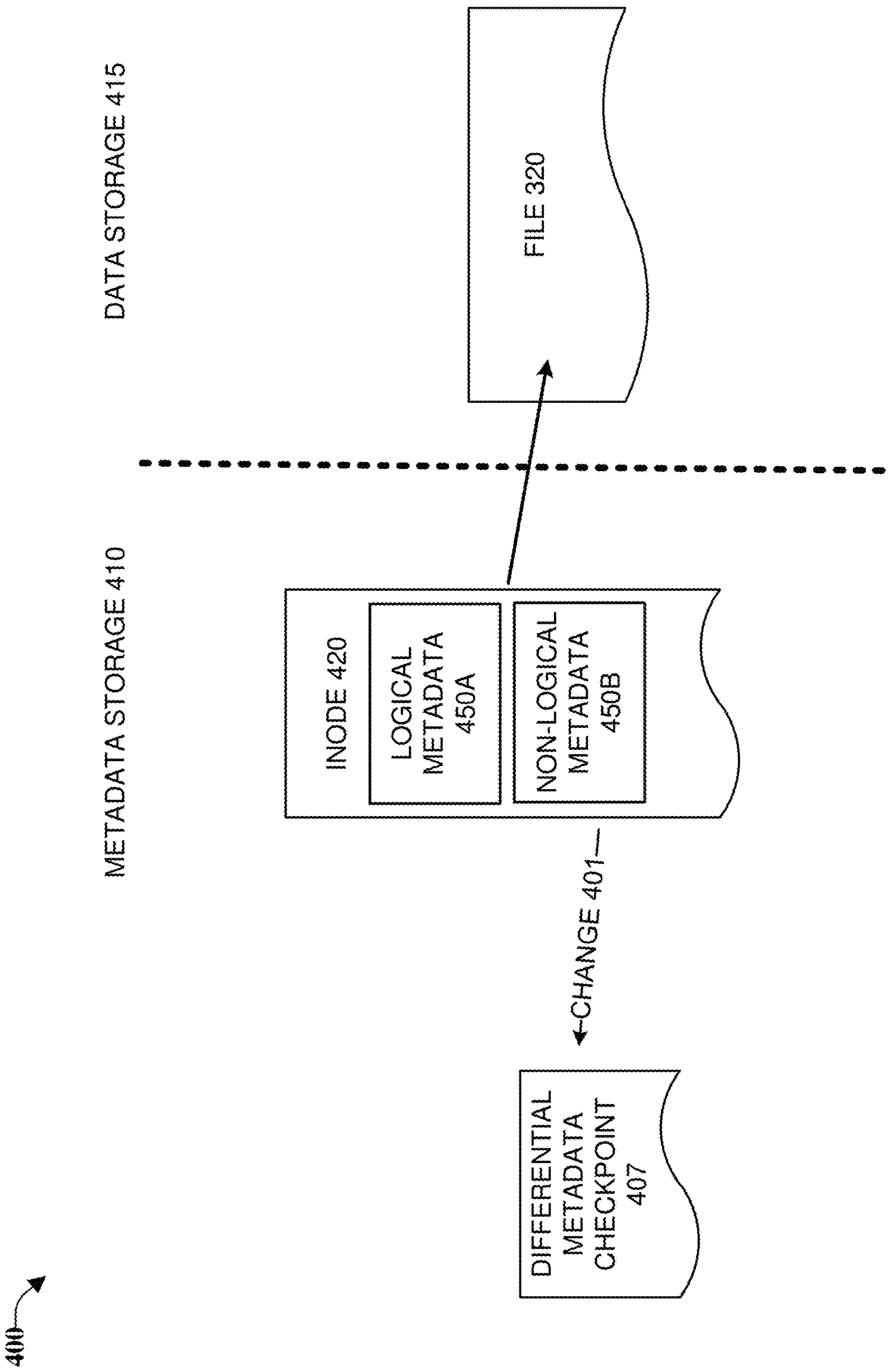
FIG. 4 includes a diagram of an example system that can facilitate using differential checkpoints to search non-logical file system metadata, in accordance with one or more embodiments.

FIG. 4 includes a diagram of an example system 400 that can facilitate using differential checkpoints to search non-logical file system metadata, in accordance with one or more embodiments. System 400 includes inode 420, stored in metadata storage 410 and referencing file 320 stored in data storage 415. In system 400, a change to non-logical metadata 450B is incorporated into differential metadata checkpoint 407.

In some implementations, inode 420 may be a fundamental data structure within a file system, acting as a logical abstraction to manage and represent file metadata. For file 320, inode 420 includes logical metadata 450A (e.g., one or more of, file type, permissions, ownership, size, timestamps, link count, file flags and attributes, and extended attributes) as well as non-logical metadata 450B, e.g., one or more of, data block pointers, allocation status, storage location, file system type, journaling information, redundancy mapping, block alignment details, and physical size. Examples discussed herein refer to storage location, but other non-logical metadata may also be used.

As noted with FIG. 3 above, one or more embodiments can store a differential snapshot (e.g., differential metadata checkpoint 407) that incorporates changes to non-logical metadata 450B. Thus, in an implementation, when file 320 is logically moved between tiers 310A-B, non-logical metadata 450B of inode 420 is changed, and this change 401 is detected and incorporated for searching and analysis into differential metadata checkpoint 407.

Stated differently, in one or more embodiments, a file descriptor associated with file 320 may be modified (e.g., inode 420) resulting in a change to a non-logical characteristic of the file, e.g., non-logical metadata 450B. A state capture of the file system may be generated (e.g., differential metadata checkpoint 407), that includes the change to the non-logical characteristic of the file. Based on the state capture, a searchable collection of states of the file system may be updated (e.g., database server 180 may be modified to include data corresponding to differential metadata checkpoint 407). A search of the searchable collection of states may provide results that include the change to the non-logical characteristic of the file.

Figure 5:
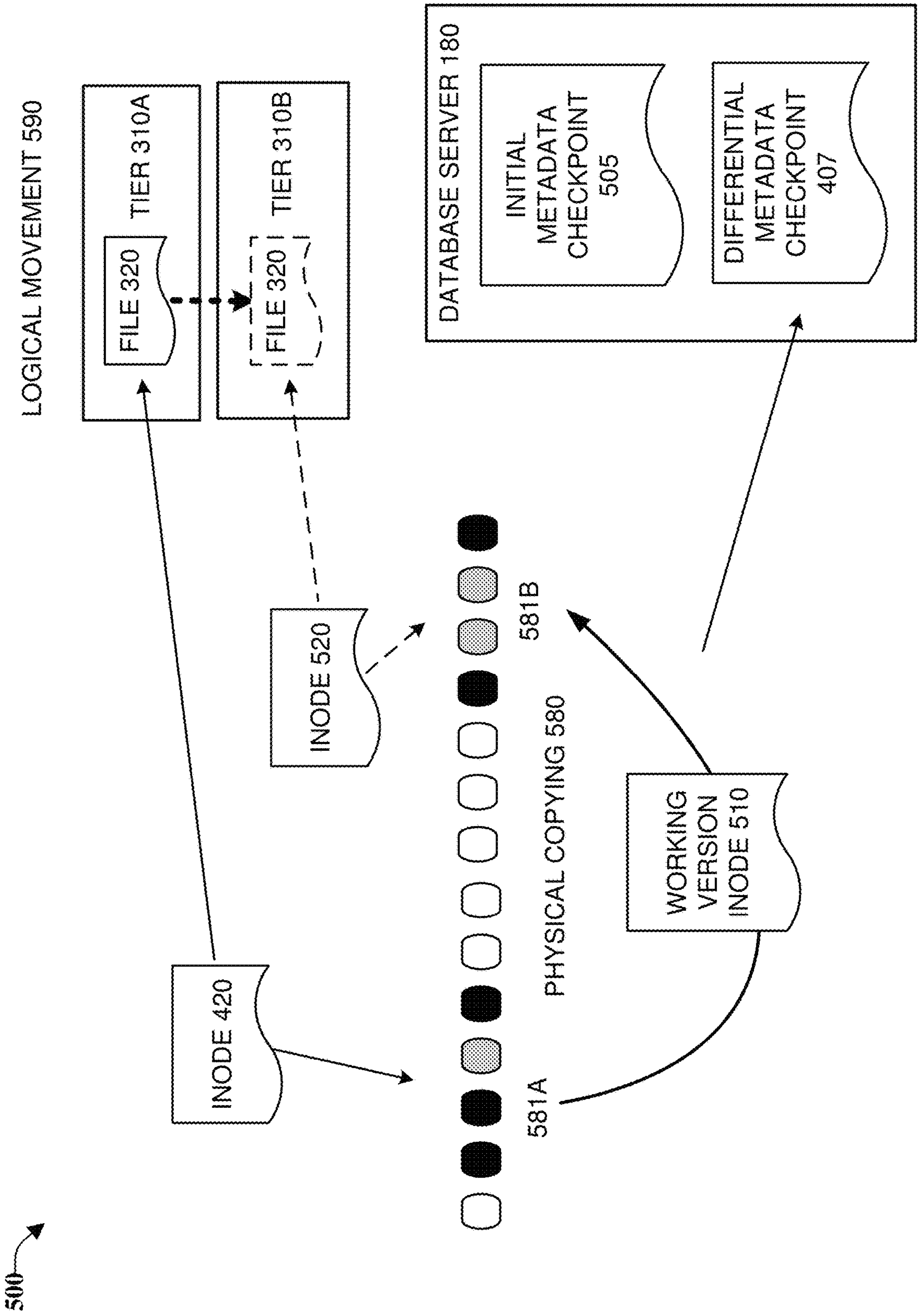
FIG. 5 includes a diagram of an example system that can facilitate using differential checkpoints to search non-logical file system metadata, in accordance with one or more embodiments.

FIG. 5 includes a diagram of an example system 500 that can facilitate using differential checkpoints to search non-logical file system metadata, in accordance with one or more embodiments. System 500 includes depictions of a logical movement 590 of file 320 from tier 310A to tier 310B. System 500 further links the depictions of logical movement 590 with the physical copying 580 of inode 420 (also termed an object descriptor herein) at data blocks 581A to inode 520 at data blocks 581B. Physical copying 580 is depicted a being performed via working version inode 510. System 500 further depicts the generation of differential metadata checkpoint 507 and the storing of differential metadata checkpoint 507 with initial metadata checkpoint 505 at database server 180. Generally speaking, in one or more embodiments, when inode 420 is modified, system 400 may perform a write isolation procedure, e.g., also termed a copy-on-write procedure. This event is then detected and included as a change in differential metadata checkpoint 407.

File 320 is sought to be physically moved from tier 310A to tier 310B. In an example, file system processes move (or copy) data blocks corresponding to file 320 from a hardware device grouped in tier 310A to a hardware device grouped in tier 310B, e.g., without logical attributes of file 320 being changed.

Based on the move from tier 310A to tier 310B, in this example, the physical location of the data blocks of file 320 is stored as non-logical metadata 450B in inode 420 stored at physical location 581. Instead of modifying the data blocks of data blocks 581A, one or more embodiments loads working version inode 510, and writes a modified version of working version inode 510 to data blocks 581B as inode 520. Different file system implementations select a time for switching the inode that represents file 320 from inode 420 to inode 520 (e.g., committing the change to inode 420), but this commit time does not affect one or more embodiments.

Continuing this example, in an implementation, when the modified version of working version inode 510 is written to data blocks 581B, inode 520 is added to a change list as a change to inode 420. It is appreciated that the use of a particular change list and/or the time at which the change is detected and stored can vary without affecting the implementation of embodiments.

In an implementation, the change list may be utilized (e.g., by snapshot component 126) to generate differential metadata checkpoint 407. Returning to system 200 discussed with FIG. 2 above, one or more embodiments of command component 222 may receive a data modification command that was generated based on differential metadata checkpoint 407. Executing component 224 then executes the data modification command at database server 180 resulting in storage of a database record includes data corresponding to differential metadata checkpoint 407.

In one or more embodiments, at the executing of the data modification command at database server 180, the database includes initial metadata checkpoint 505, e.g., corresponding to the state of the file system before the change to the metadata of file 320.

In one or more embodiments, a search for the change to the non-logical property of the metadata of the file may be based on differential metadata checkpoint 407, e.g., based on a combining of a differential snapshot with a base snapshot of the file system before the change, e.g., initial metadata checkpoint 505. Thus, in this example, a first version of the metadata (e.g., inode 420) is stored in the base snapshot and a second version of the metadata (e.g., inode 520) is included in the differential snapshot.

In an example implementation, in addition to changing the physical location of file 320 for economical and/or performance reasons, the changing of the physical location of file 320 may occurs during a restriping of the file system that implicates the physical storage location where the file data is stored, e.g., modifying of the non-logical characteristic of the file is based on at least part of a fault-tolerant data storage procedure employed to store data of the file system.

Figure 6:
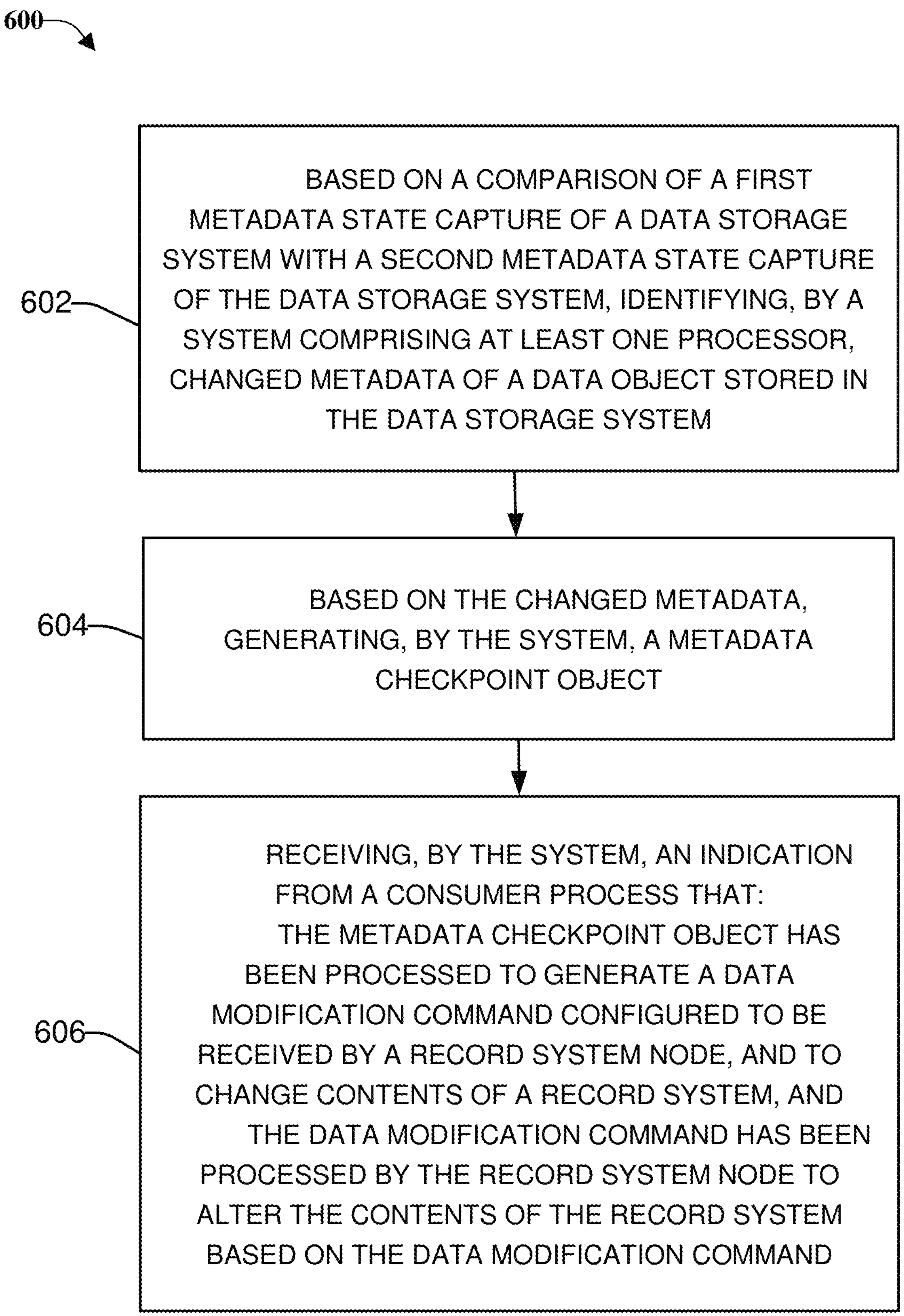
FIG. 6 depicts an example flow diagram representing example operations of an example method that can facilitate using differential checkpoints to search non-logical file system metadata, in accordance with one or more embodiments.

FIG. 6 depicts a flow diagram representing example operations of an example method 600 that can facilitate using differential checkpoints to search non-logical file system metadata, in accordance with one or more embodiments. For purposes of brevity, description of like elements and/or processes employed in other embodiments is omitted.

In some examples, one or more embodiments of method 600 can be implemented by modifying component 122, storing component 124, snapshot component 126, and other components that can be used to implement aspects of method 600, in accordance with one or more embodiments. FIG. 6, described below, illustrates methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

At 602 of method 600, modifying component 122 of file system equipment 150 can modify a working version of metadata that was retrieved from a first physical storage location in a file system, with the metadata being associated with a file of the file system, resulting in a change to a non-logical property of the metadata. At 604 of method 600, storing component 124 can store the working version of the metadata in a second physical storage location in the file system different from the first physical storage location. At 606 of method 600, snapshot component 126 can, based on the change, generate a differential snapshot of the file system.

Figure 7:
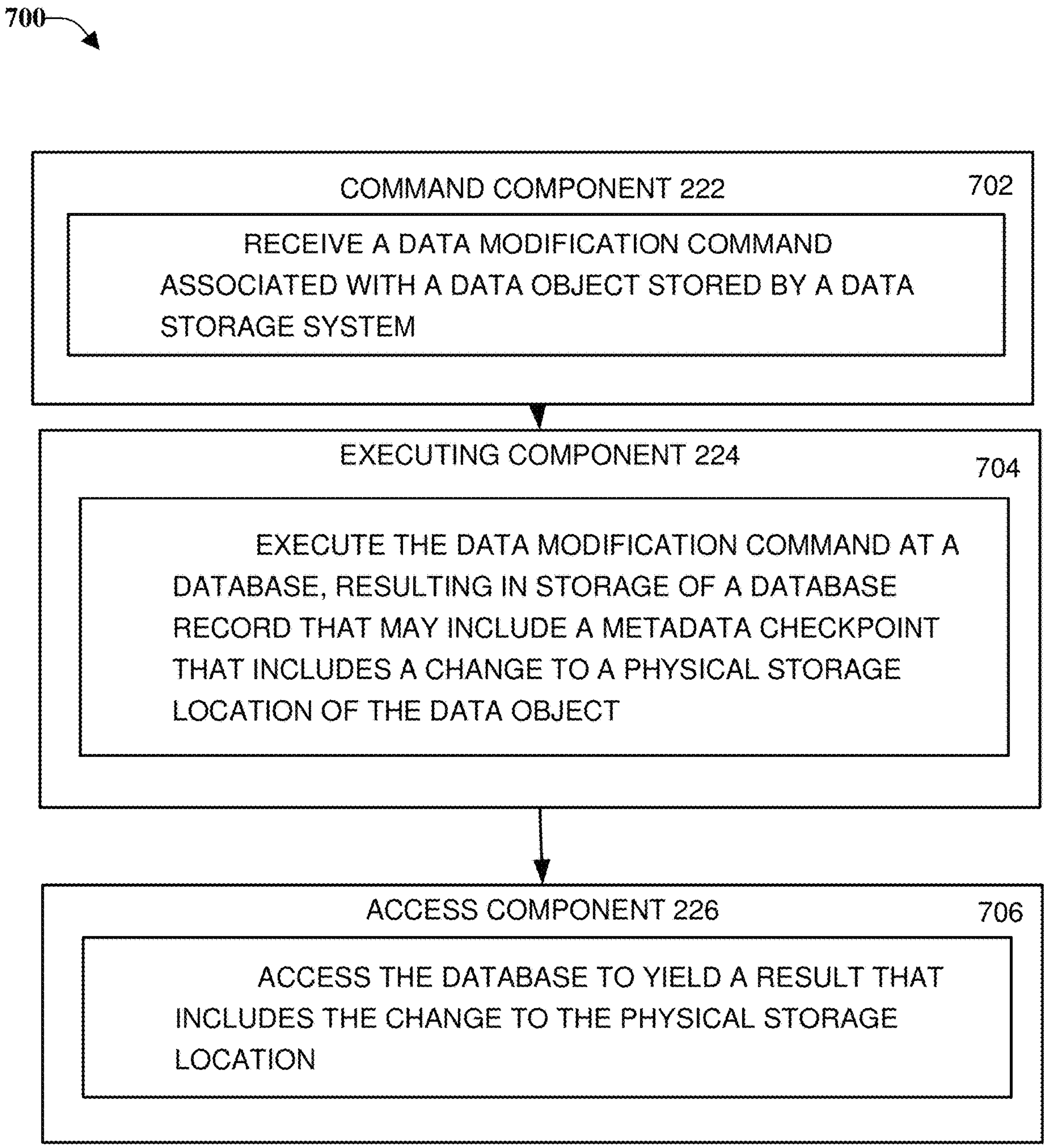
FIG. 7 depicts an example system that can facilitate using differential checkpoints to search non-logical file system metadata, in accordance with one or more embodiments.

FIG. 7 depicts an example system 700 that can facilitate using differential checkpoints to search non-logical file system metadata, in accordance with one or more embodiments. For purposes of brevity, description of like elements and/or processes employed in other embodiments is omitted.

Example system 700 can include command component 222, executing component 224, access component 226, and other components that can be used to implement aspects of system 700, as described herein, in accordance with one or more embodiments. At 702 of FIG. 7, command component 222 can receive a data modification command associated with a data object stored by a data storage system. At 704 of FIG. 7, executing component 224 can execute the data modification command at a database, resulting in storage of a database record that may include a metadata checkpoint that may include a change to a physical storage location of the data object. At 706 of FIG. 7, access component 226 can access the database to yield a result that includes the change to the physical storage location.

Figure 8:
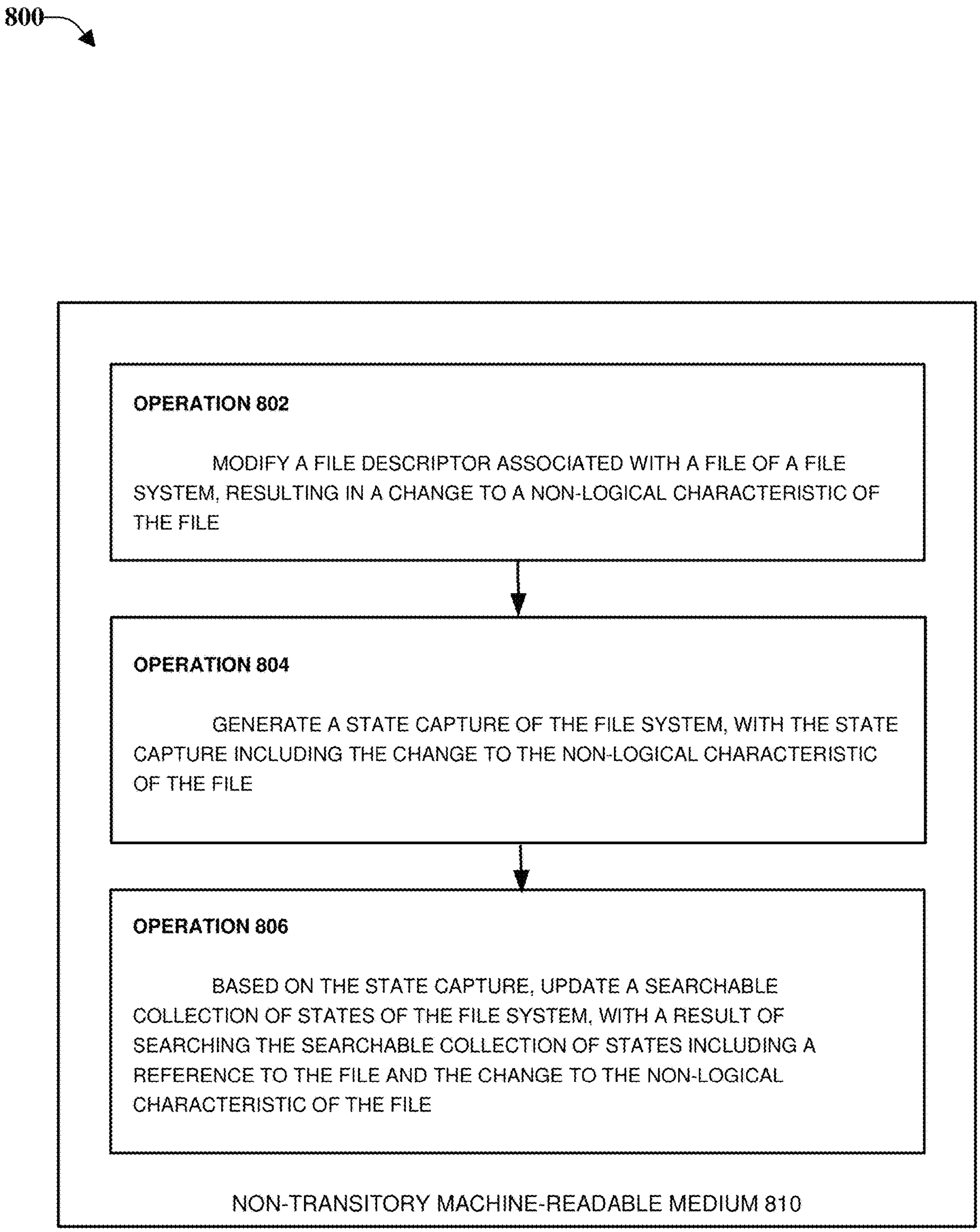
FIG. 8 depicts an example non-transitory machine-readable medium 810 can include executable instructions that, when executed by a processor of a system, can facilitate using differential checkpoints to search non-logical file system metadata, in accordance with one or more embodiments.

FIG. 8 depicts an example 800 non-transitory machine-readable medium 810 that can include executable instructions that, when executed by a processor of a system, can facilitate using differential checkpoints to search non-logical file system metadata, in accordance with one or more embodiments. For purposes of brevity, description of like elements and/or processes employed in other embodiments is omitted.

As depicted, non-transitory machine-readable medium 810 includes executable instructions that, when executed by at least one processor of a machine learning device, facilitate performance of operations that include operation 802 which modifies a file descriptor associated with a file of a file system, resulting in a change to a non-logical characteristic of the file. The operations may further include operation 804 which generates a state capture of the file system, with the state capture including the change to the non-logical characteristic of the file. Further, the operations may include operation 806 which, based on the state capture, updates a searchable collection of states of the file system, with a result of searching the searchable collection of states including a reference to the file and the change to the non-logical characteristic of the file.

Figure 9:
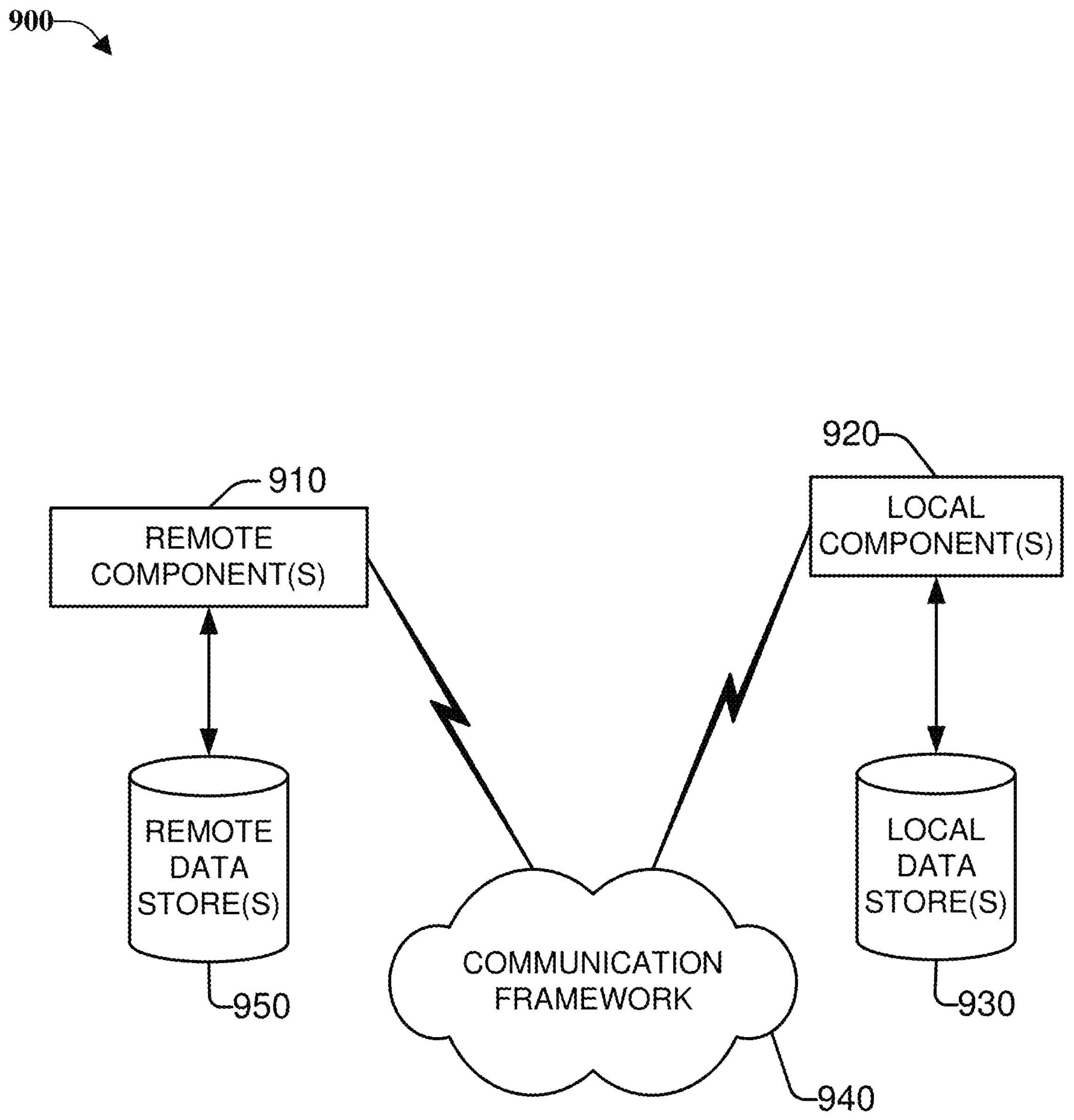
FIG. 9 is an example schematic block diagram of a system with which the disclosed subject matter can interact.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in different systems, e.g., both local and remote memory storage devices.

Figure 10:
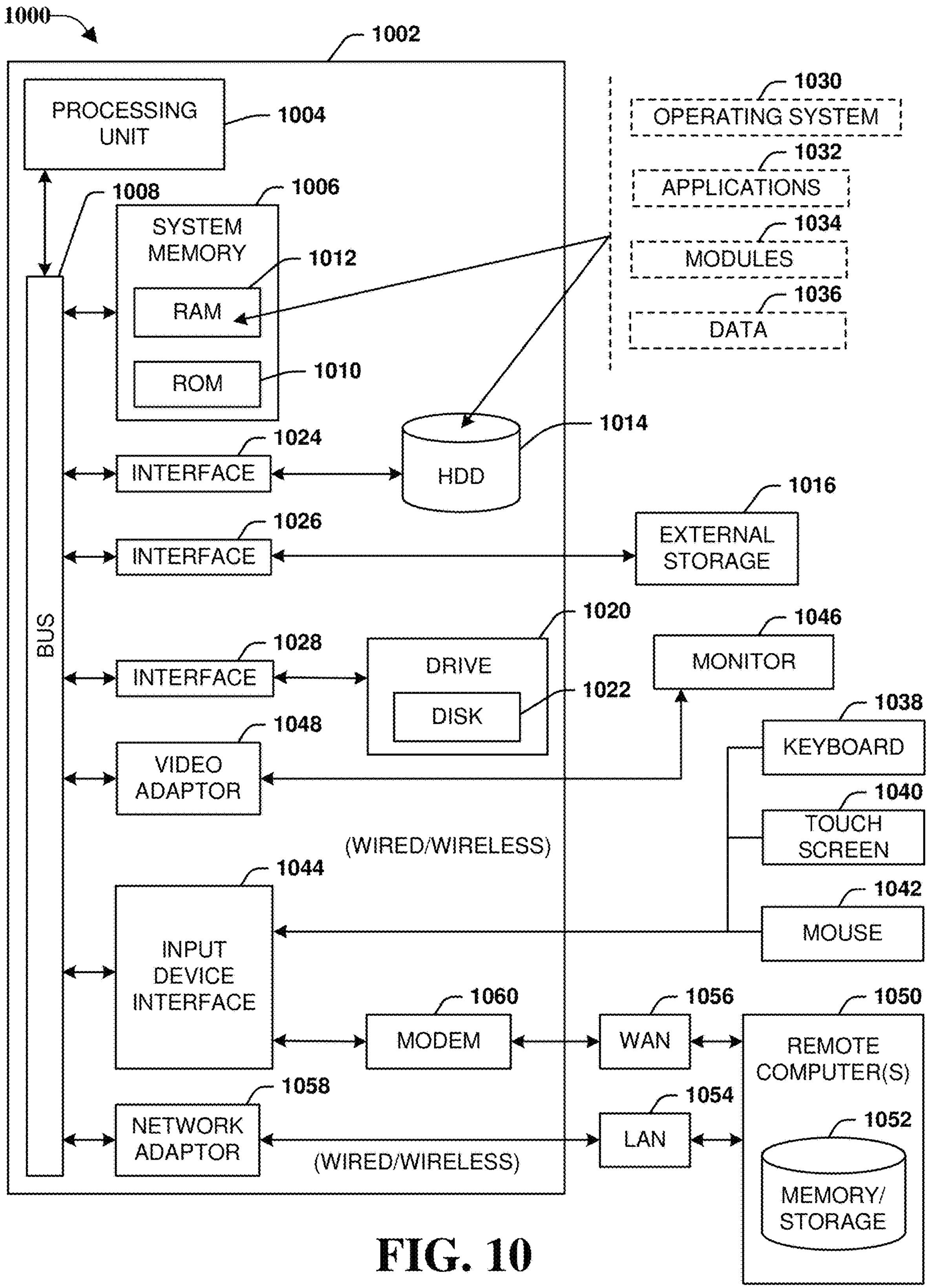
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations," this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application program interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network," "core," "core carrier network," "carrier-side," or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

based on a change to a non-logical property of metadata associated with a file stored at a first physical storage location of a file system, generating, by a system comprising at least one processor, a working version of the metadata that comprises the change;

based on the metadata and the working version of the metadata, generating differential metadata checkpoint data file from a working version of the metadata that was retrieved from a first physical storage location in a file, wherein the non-logical property comprises one or more of an allocation status of the file, a storage location of the file, a file system type of the file, journaling information of the file, a redundancy mapping of the file, block alignment details of the file, or a physical size of the file;

storing, by the system, the differential metadata checkpoint data at file in a second physical storage location in the file system different from the first physical storage location; and adding, by the system, the working version of the metadata to a change list; and based on the differential metadata checkpoint data, base metadata checkpoint data that was stored before the change, and the change list, generating, by the system, a differential snapshot of the file system that comprises a representation of the change to the non-logical property of the metadata.

2. The method of claim 1, wherein the metadata is comprised in an inode that references the file, and wherein the storing of the differential metadata checkpoint data results in a modified inode.

3. The method of claim 2, wherein the storing of the differential metadata checkpoint data comprises storing the modified inode to the second physical storage location.

4. The method of claim 1, wherein the non-logical property comprises a physical storage location where file data corresponding to the file is stored within storage of the file system, and wherein the changing of the non-logical property comprises changing the physical storage location where the file data is stored.

5. The method of claim 4, wherein the physical storage location comprises a tier of tiers of the file system.

6. The method of claim 5, further comprising, based on the differential snapshot, analyzing, by the system, historical movement of the file data to different tiers of the file system.

7. The method of claim 4, wherein the changing of the non-logical property occurs during a restriping of the file system that implicates the physical storage location where the file data is stored.

8. The method of claim 1, further comprising committing, by the system, the change to the non-logical property of the metadata.

9. The method of claim 1, further comprising, based on the differential snapshot, enabling, by the system, a search for the change to the non-logical property of the metadata of the file.

10. The method of claim 9, wherein the search is enabled based on a combining of the differential snapshot with a base snapshot of the file system before the change.

11. The method of claim 10, wherein the search comprises a search of a first version of the metadata that was comprised in the base snapshot and a second version of the metadata that was comprised in the differential snapshot.

12. The method of claim 1, wherein the storing of the differential metadata checkpoint data of the metadata in at the second physical storage location comprises performing a copy on write procedure with the change to the non-logical property of the metadata.

13. A computing system, comprising:

at least one memory that stores computer executable instructions; and at least one processor configured to process the computer executable instructions that, when executed by the at least one processor, facilitate performance of operations, comprising:

receiving a data modification command associated with a change to a non-logical property of metadata of a data object stored by a data storage system, executing the data modification command at a database, resulting in storage of a database record that comprises differential metadata checkpoint data, wherein the differential metadata checkpoint data was generated based on the metadata before the change and a working version of the metadata that comprises the change, wherein the working version of the metadata was added to a change list, and wherein the comprises a change to a non-logical property of the data object comprising comprises one or more of an allocation status of the data object, a storage location of the data object, a file system type of the data object, journaling information of the data object, a redundancy mapping of the data object, block alignment details of the data object, a change to a physical storage location of the data object, or a physical size of the data object, accessing the database to yield base metadata checkpoint data that was stored before the change, and based on the differential metadata checkpoint data, the base metadata checkpoint data, and the change list, generating a differential snapshot of the data storage system that comprises a representation of the change to the non-logical property of the metadata a result comprising the change to the physical storage location.

14. The computing system of claim 13, wherein the physical storage location comprises a diskpool of diskpools of the data storage system, wherein the diskpool corresponds to a storage device, and wherein the result comprises differential snapshot of the data storage system facilitates an analysis of historical movement of data object that comprises the data object being moved among the diskpools.

15. The computing system of claim 14, wherein the analysis comprises analysis of movement of the data object from a first diskpool having a performance capability to a second diskpool having a different performance capability.

16. The computing system of claim 13, wherein the metadata checkpoint comprises a differential checkpoint, wherein, at the executing of the data modification command, the database comprises an initial metadata checkpoint of the data storage system, and wherein the accessing of the database comprises a search of a combination of the initial base metadata checkpoint data and the differential metadata checkpoint data.

17. The computing system of claim 13, wherein the differential metadata checkpoint data comprises a data representative of a change to an object descriptor that references the data object, and wherein the metadata checkpoint was generated based on a change to the object descriptor being detected and referenced by the metadata checkpoint.

18. A non-transitory machine-readable medium comprising executable instructions that, when executed by at least one processor of a machine learning device, facilitate performance of operations, the operations comprising:

modifying a non-logical characteristic of metadata associated with a file of a file system, resulting in a change to the non-logical characteristic of the metadata of the file, wherein the non-logical characteristic comprises one or more of an allocation status of the file, a storage location of the file, a file system type of the file, journaling information of the file, a redundancy mapping of the file, block alignment details of the file, or a physical size of the file generating a working version of the metadata that comprises the change;

based on the metadata and the working version of the metadata, generating differential metadata checkpoint data state capture of the file system, wherein the state capture comprises the change to the non-logical characteristic of the file;

adding the working version of the metadata to a change list; and based on the differential metadata checkpoint data, base metadata checkpoint data that was stored before the change, and the change list, generating, by the system, a differential snapshot of the file system that comprises a representation of the change to the non-logical characteristic of the metadata, updating a searchable collection of states of the file system, wherein a result of searching the searchable collection of states comprising a reference to the file and the change to the non-logical characteristic of the file.

19. The non-transitory machine-readable medium of claim 18, wherein the modifying of the non-logical characteristic of the file comprises modifying a file descriptor of the file with a write isolation procedure.

20. The non-transitory machine-readable medium of claim 18, wherein the modifying of the non-logical characteristic of the file is based on a fault-tolerant data storage procedure employed to store data of the file system.

* * * * *